(12) United States Patent
Leonhardt et al.

(10) Patent No.: US 6,905,282 B2
(45) Date of Patent: Jun. 14, 2005

(54) VEHICLE MOUNTED CRASH ATTENUATOR

(75) Inventors: Patrick A. Leonhardt, Rocklin, CA (US); Andrew A. Porterfield, Sacramento, CA (US)

(73) Assignee: Energy Absorption Systems, Inc., Chicago, IL (US)

( * ) Notice: Subject to any disclaimer, the term of this patent is extended or adjusted under 35 U.S.C. 154(b) by 0 days.

(21) Appl. No.: 10/628,319

(22) Filed: Jul. 28, 2003

(65) Prior Publication Data

US 2004/0145173 A1 Jul. 29, 2004

Related U.S. Application Data

(63) Continuation of application No. 10/002,833, filed on Nov. 1, 2001, now abandoned
(60) Provisional application No. 60/325,729, filed on Sep. 28, 2001.

(51) Int. Cl.[7] .................................................. E01F 15/00
(52) U.S. Cl. .............................................. 404/6; 293/133
(58) Field of Search ........................... 404/6; 293/133; 256/13.1; 405/212, 215

(56) References Cited

U.S. PATENT DOCUMENTS

| | | |
|---|---|---|
| 3,506,295 A | 4/1970 | Yancey |
| 3,674,115 A | 7/1972 | Young et al. |
| 3,757,562 A | 9/1973 | Goldberg et al. |
| 3,930,665 A | 1/1976 | Ikawa |
| 3,944,187 A | 3/1976 | Walker |
| 3,972,390 A | 8/1976 | Melton et al. |
| 4,008,915 A | 2/1977 | Walker |
| 4,190,275 A | 2/1980 | Mileti |
| 4,204,659 A | 5/1980 | Phillips et al. |
| 4,221,413 A | 9/1980 | Bonnetain |
| 4,227,593 A | 10/1980 | Bricmont et al. |

(Continued)

FOREIGN PATENT DOCUMENTS

| | | |
|---|---|---|
| GB | 2 286 160 A | 8/1995 |
| WO | WO 94/05527 A1 | 3/1994 |

OTHER PUBLICATIONS

Letter from Lancer Industries Ltd. to M.S. Dreznes, (Jun. 8, 1992).

Copy of New Zealand Provisional Specification, Kenron Trading Limited, Winstone, R., "Improvements In and Relating To Impact Absorption Means," Filed Nov. 11, 1991, 7 pages.

(Continued)

*Primary Examiner*—Robert E. Pezzuto
*Assistant Examiner*—Raymond W Addie
(74) *Attorney, Agent, or Firm*—Brinks Hofer Gilson & Lione

(57) ABSTRACT

A vehicle mounted crash attenuator includes first and second bays mounted together at a rotational joint. One or more hydraulic cylinders are mounted between the bays to move the second bay between a deployed position, in which the first and second bays are aligned horizontally, and a retracted position, in which the second bay is rotated about the rotational joint by a rotation angle greater than 90° from the deployed position. In this way, the second bay is raised above the first bay, and the overall length of the crash attenuator is shortened, all without excessively increasing the overall height of the crash attenuator.

26 Claims, 11 Drawing Sheets

U.S. PATENT DOCUMENTS

| | | | |
|---|---|---|---|
| 4,352,484 | A | 10/1982 | Gertz et al. |
| 4,407,484 | A | 10/1983 | Meinzer |
| 4,413,856 | A | 11/1983 | McMahan et al. |
| 4,452,431 | A | 6/1984 | Stephens et al. |
| 4,635,981 | A | 1/1987 | Friton |
| 4,655,434 | A | 4/1987 | Bronstad |
| 4,658,941 | A * | 4/1987 | Gottwald et al. .......... 188/377 |
| 4,674,911 | A | 6/1987 | Gertz |
| 4,711,481 | A | 12/1987 | Krage et al. |
| 4,770,420 | A | 9/1988 | Gottwald et al. |
| 5,052,732 | A | 10/1991 | Oplet et al. |
| 5,123,775 | A | 6/1992 | Bryant |
| 5,199,755 | A * | 4/1993 | Gertz .......... 293/120 |
| 5,248,129 | A | 9/1993 | Gertz |
| 5,403,112 | A | 4/1995 | Carney, III |
| 5,403,113 | A | 4/1995 | Gertz et al. |
| 5,551,796 | A | 9/1996 | Anderson, Jr. et al. |
| 5,577,861 | A | 11/1996 | Oberth et al. |
| 5,642,792 | A | 7/1997 | June |
| 5,697,657 | A | 12/1997 | Unrath, Sr. |
| 5,797,592 | A | 8/1998 | Machado |
| 5,823,584 | A | 10/1998 | Carney, III |
| 5,851,005 | A | 12/1998 | Muller et al. |
| 5,868,521 | A | 2/1999 | Oberth et al. |
| 5,947,452 | A | 9/1999 | Albritton |
| 6,024,341 | A | 2/2000 | Gertz |
| 6,092,959 | A * | 7/2000 | Leonhardt et al. .......... 404/6 |
| 6,098,767 | A | 8/2000 | Unrath |
| 6,116,805 | A | 9/2000 | Gertz |
| 6,183,042 | B1 | 2/2001 | Unrath |
| 6,186,565 | B1 | 2/2001 | Unrath |
| 6,203,079 | B1 | 3/2001 | Breed |
| 6,244,637 | B1 | 6/2001 | Leonhardt et al. |
| 6,581,992 | B1 * | 6/2003 | Gertz .......... 293/133 |

OTHER PUBLICATIONS

Copy of Media Release and Copies of Photographs of Fold–over TMA, Lancer Industries Limited, "Crashbag to Save Lives on Motorways," Dec. 18, 1991, 7 pages.

Trinity Industries, Inc., Blueprint–MPS 350, Version 1.2, dated Feb. 2001, 1 page.

Trinity Industries, Inc., "Products—Taking Highway Safety Into the 21st Century!™: MPS–350™", obtained at the internet address <http://www.highwayguardrail.com/Products%20–%20MPS.html>, on Jul. 22, 2003, 2 pages.

Trinity Industries, Inc., "MPS 350 Mobile Protection System Product Manual —Installation, Operation, Maintenance: An NCHRP Report 350—TL3 Truck Mounted Attenuator", A Trinity Industries publication, dated Apr. 5, 2001, pp. 1–27, obtained from the Internet at <http://www.highwayguardrail.com/Products%20–%20MPS.html>, on Jul. 22, 2003, 2 pages.

Copies of Photographs 1–4 of truck mounted attenuator used in the U.S. before Sep. 28, 2001, 4 pages.

Internationl Search Report in International Application No. PCT/US02/27863, dated Nov. 6, 2003, 5 pages.

Copies of Photographs of fold–over TMA from Idaho, (Jun., 2003)(depicted Truck/TMA in public use before Sep. 28, 2000), 10 pages.

Copies of brochure, "The Dumpster TMA (with the 2001 MD Cartridge)," 3 pages, date unknown.

* cited by examiner

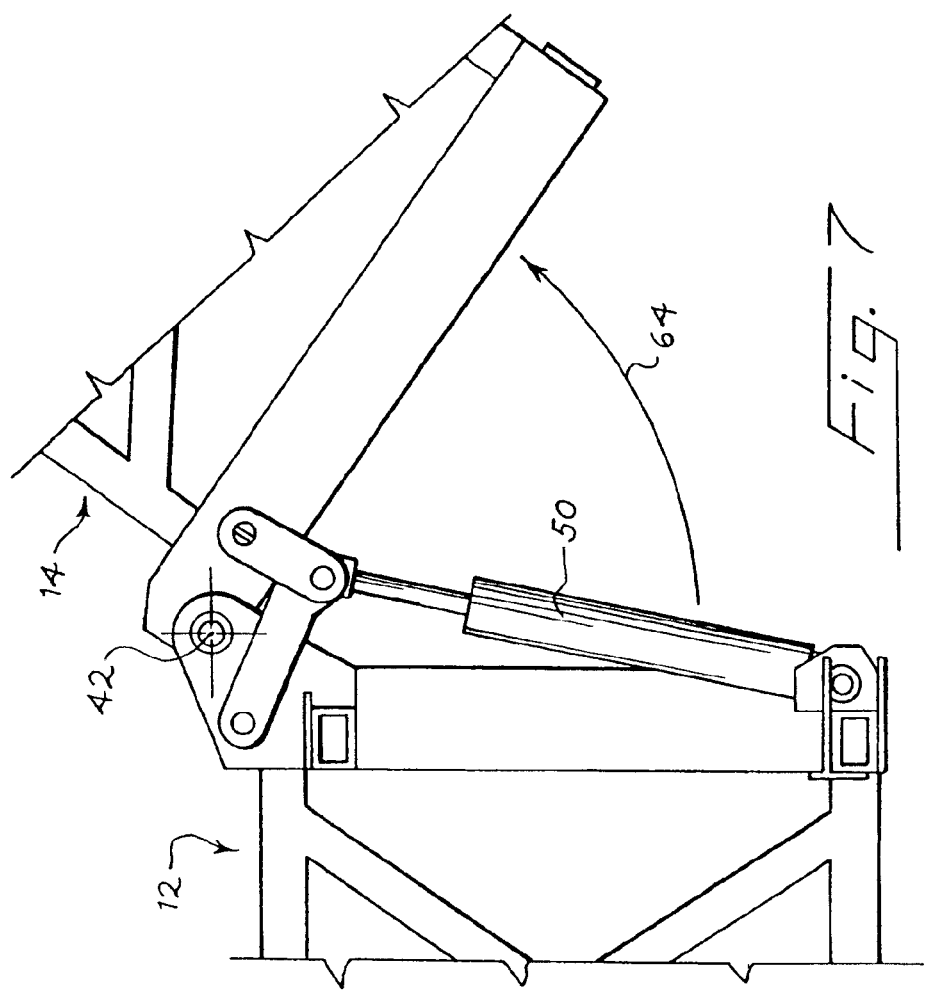
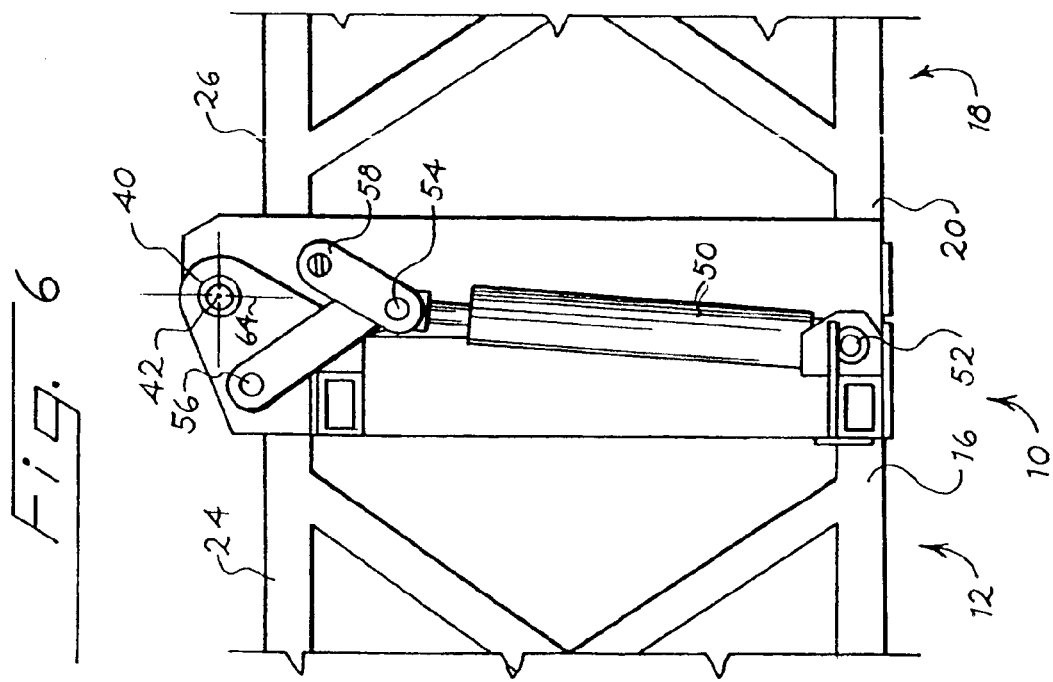

VEHICLE MOUNTED CRASH ATTENUATOR

CROSS REFERENCE TO RELATED PATENT APPLICATION

This application is a continuation of U.S. patent application Ser. No. 10/002,833, filed Nov. 1, 2001, now abandon which claims the benefit of the filing date of U.S. provisional patent application Ser. No. 60/325,729, filed Sep. 28, 2001, the entire disclosures of which are hereby incorporated by reference herein.

BACKGROUND

The present invention relates to vehicle mounted crash attenuators, and in particular to arrangements for facilitating transport of such crash attenuators.

Vehicle mounted crash attenuators such as those described in Leonhardt U.S. Pat. No. 6,092,959 are commonly used in highway repair and construction. Heavy vehicles such as trucks, sweepers, and other moving vehicles are positioned in front of a work zone to protect workers in the work zone from oncoming traffic. Vehicle mounted crash attenuators are mounted to face oncoming traffic, in order to protect an oncoming vehicle in the event of a collision with the truck.

Typically, such vehicle mounted crash attenuators are deployed to a horizontal position in use, and they are often pivoted to a vertical position for transport. Modern vehicle mounted crash attenuators have a substantial length, and when such a crash attenuator is pivoted to a vertical position for transport, it may extend vertically to a substantial height that prevents the vehicle from traveling under overpasses, through door openings, and the like.

The above-identified Leonhardt patent, assigned to the Assignee of the present invention, teaches a solution to this problem that involves partially collapsing the crash attenuator, thereby reducing its overall height. Other prior-art patents that disclose vehicle mounted crash attenuators that are pivoted vertically for transport include Friton U.S. Pat. No. 4,635,981, Oplet U.S. Pat. No. 5,052,732 and Unrath U.S. Pat. Nos. 6,098,767, 6,183,042, and 6,186,565.

Another prior-art approach hinges the vehicle mounted crash attenuator in two places: one adjacent to the vehicle and another near the midpoint of the crash attenuator. When fully folded, this crash attenuator includes a first portion that extends vertically upwardly adjacent the rear of the vehicle, and a second portion that extends horizontally forwardly, over the rear portion of the vehicle. The result is a crash barrier that is folded into a right angle, L-shaped configuration.

A need presently exists for an improved vehicle mounted crash attenuator that reduces the overall height of the crash attenuator in the retracted position.

SUMMARY

The preferred embodiments described below include a vehicle mounted crash attenuator having first and second bays interconnected by a rotational joint. An actuator is coupled between the first and second bays to move the second bay between a deployed position, in which the first and second bays are aligned horizontally, and a retracted position, in which the second bay is rotated about the rotational joint by a rotation angle greater than 90° with respect to the deployed position. In the illustrated embodiment, the second bay is arranged to overlie the first bay when in the retracted position. The horizontal length of this crash attenuator can be substantially reduced for transport, without increasing the overall height of the retracted crash attenuator excessively.

The foregoing sections have been provided by way of general introduction, and they are not intended to restrict the scope of the following claims.

BRIEF DESCRIPTION OF THE DRAWINGS

FIGS. 6–9 are detailed side views of central portions of the crash attenuator of FIG. 1 in the positions of FIGS. 2–5, respectively.

DETAILED DESCRIPTION OF THE DRAWINGS

Figure 1:
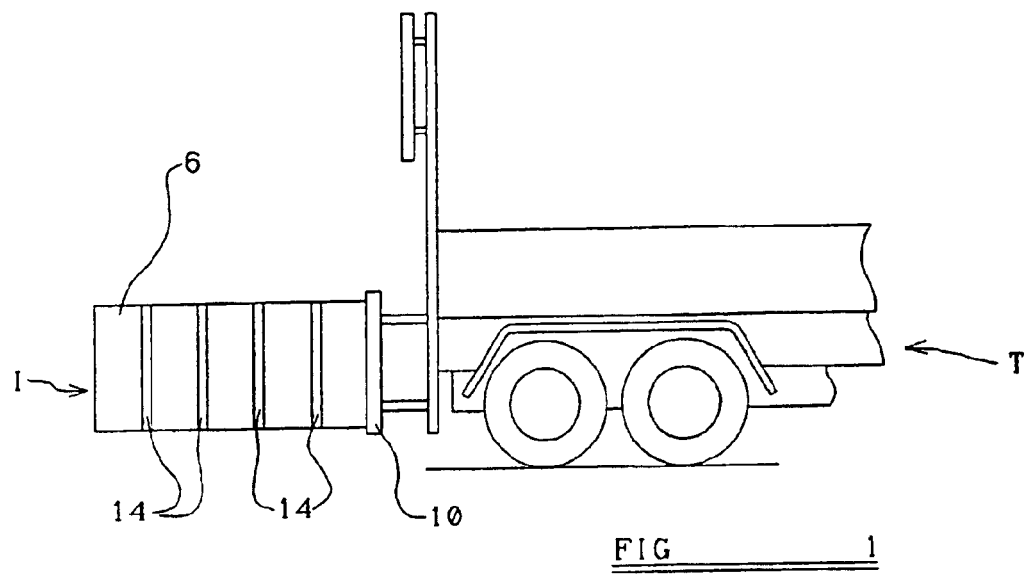
FIG. 1 is a perspective view of a vehicle mounted crash attenuator that incorporates a preferred embodiment of this invention, positioned in a deployed position.

Turning now to the drawings, FIG. 1 shows a vehicle mounted crash attenuator 10 mounted in place behind a truck T. The crash attenuator 10 includes a first bay 12 having a front end 14 and a back end 16, and a second bay 18 having a front end 20 and a back end 22. The first and second bays 12, 18 include respective upper portions 24, 26, and the back end 22 of the second bay 18 defines a lower edge 28. The front end 14 of the first bay 12 is mounted to the truck T by a mounting arrangement 30, that can for example be a rigid, fixed mounting arrangement. As shown in FIG. 1, the first bay 12 is cantilevered from the truck T, and the first bay 12 remains in a fixed orientation with respect to the truck T in both the deployed and retracted positions discussed below.

Figure 14:
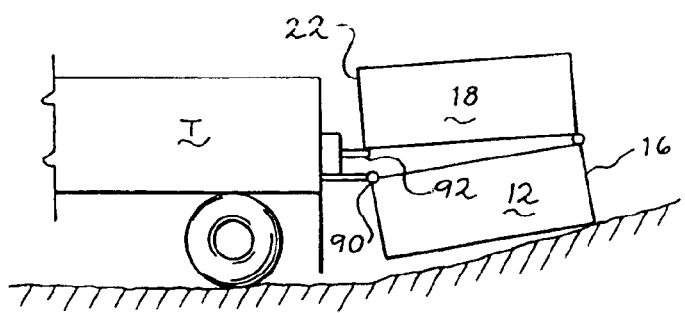
FIG. 14 is a schematic side view of another vehicle mounted crash attenuator.

Alternatively, the mounting arrangement 30 may allow the first bay 12 to pivot about a horizontal pivot axis 90 with respect to the truck T (FIG. 14). This pivoting can be entirely passive, thereby allowing the first bay 12 to tilt upwardly to pass over an obstacle, or active, thereby allowing a user to position the first bay 12 at the desired tilt angle. In FIG. 14, the back end 22 of the second bay 18 is supported in the retracted position described below by a bracket 92 secured to the truck T or other shadow vehicle. Simply by way of example, the first and second bays 12, 18 can be constructed as described in Leonhardt U.S. Pat. No. 6,092,959, assigned to the Assignee of the present invention and hereby incorporated by reference. As described in this patent, one or both of the bays may include an energy absorbing element, though such elements are not shown in FIG. 1 for clarity of illustration.

Figure 2:
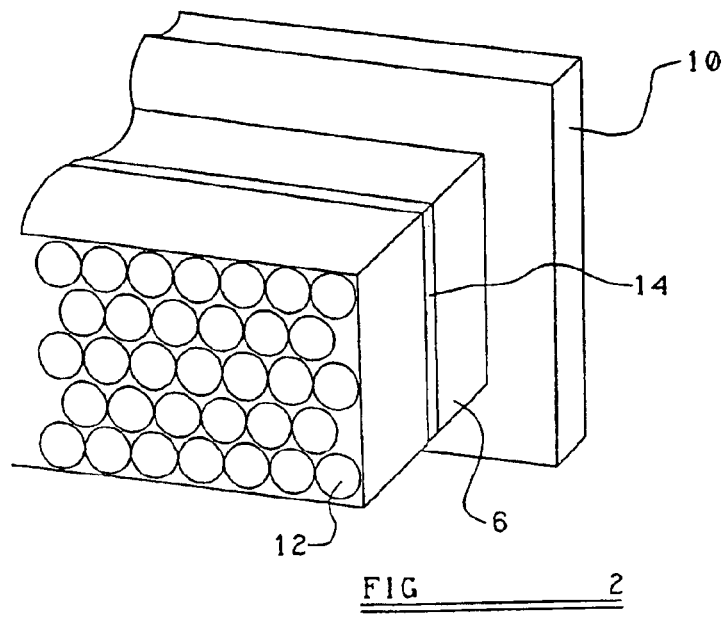
FIG. 2 is a side view of the crash attenuator of FIG. 1 in the deployed position.

As shown in FIGS. 2 and 6, the back end 16 of the first bay 12 is secured to the front end 20 of the second bay 18 by a rotational joint 40 that defines a rotational axis 42. As best shown in FIG. 6, in this embodiment the rotational axis 42 extends horizontally and is positioned adjacent the upper portions 24, 26.

Also as shown in FIG. 6, an actuator 50 is mounted between the back end 16 of the first bay 12 and the front end 20 of the second bay 18. In this example, the actuator 50 takes the form of a hydraulic ram that is mounted to the back end 16 of the first bay 12 at a lower pivot 52, and that is mounted to first and second links 56, 58 at an upper pivot 54.

The first link 56 in turn is pivotably connected to the back end 16 of the first bay 12, and the second link 58 is pivotably connected to the front end 20 of the second bay 18. In one practical example, the elements 50 through 58 are duplicated on both sides of the crash attenuator 10 to provide symmetrical forces tending to rotate the second bay 18 about the rotational axis 42.

FIGS. 2 and 6 show the crash attenuator 10 in a deployed position. Each of the bays 12, 18 defines a respective longitudinal axis 66, 68 (FIG. 2), and in the deployed position of FIG. 2 the longitudinal axes 66, 68 are substantially parallel to one another and oriented substantially horizontally (i.e. parallel to the roadway supporting the truck).

Figure 8:
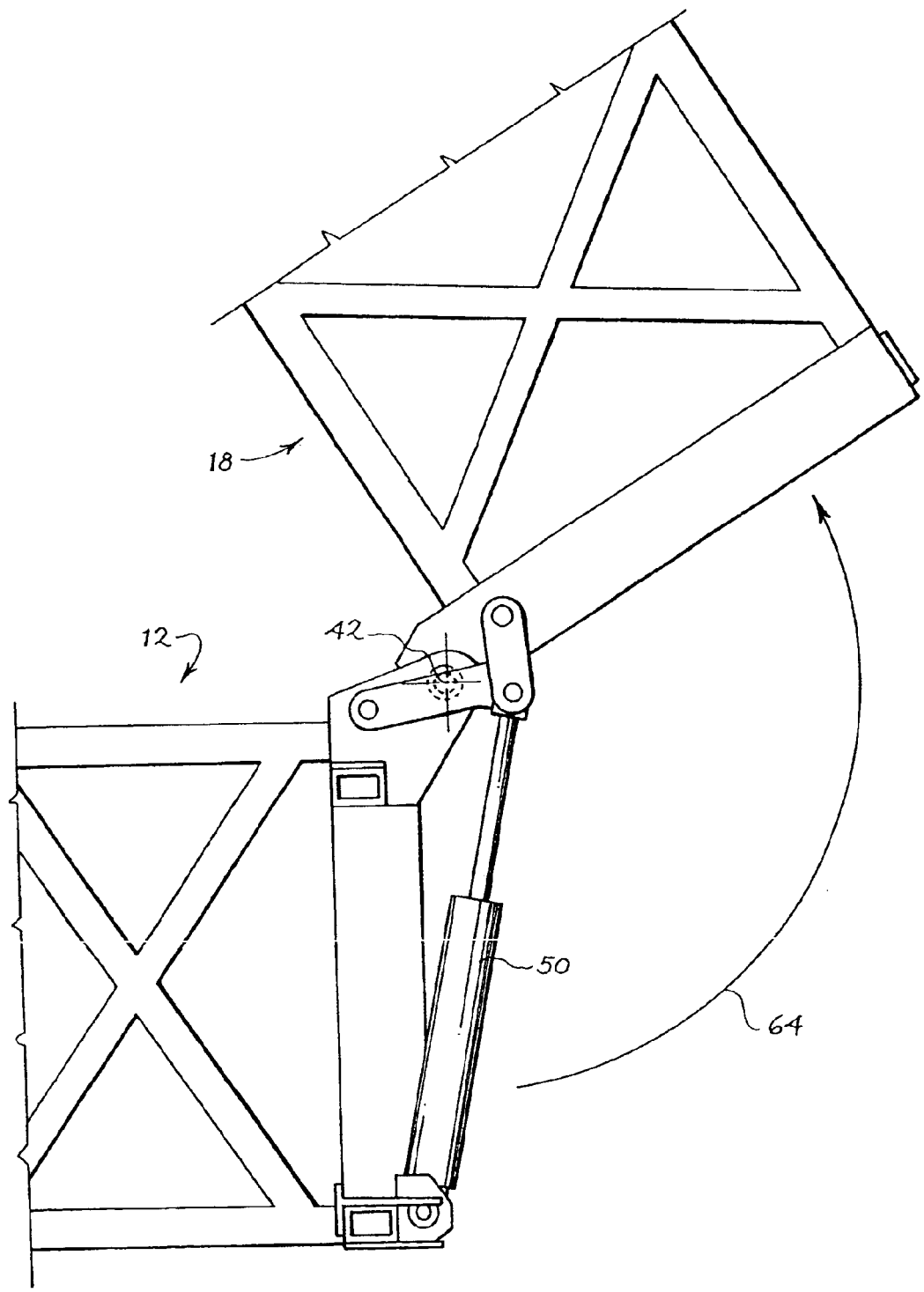
Figure 9:
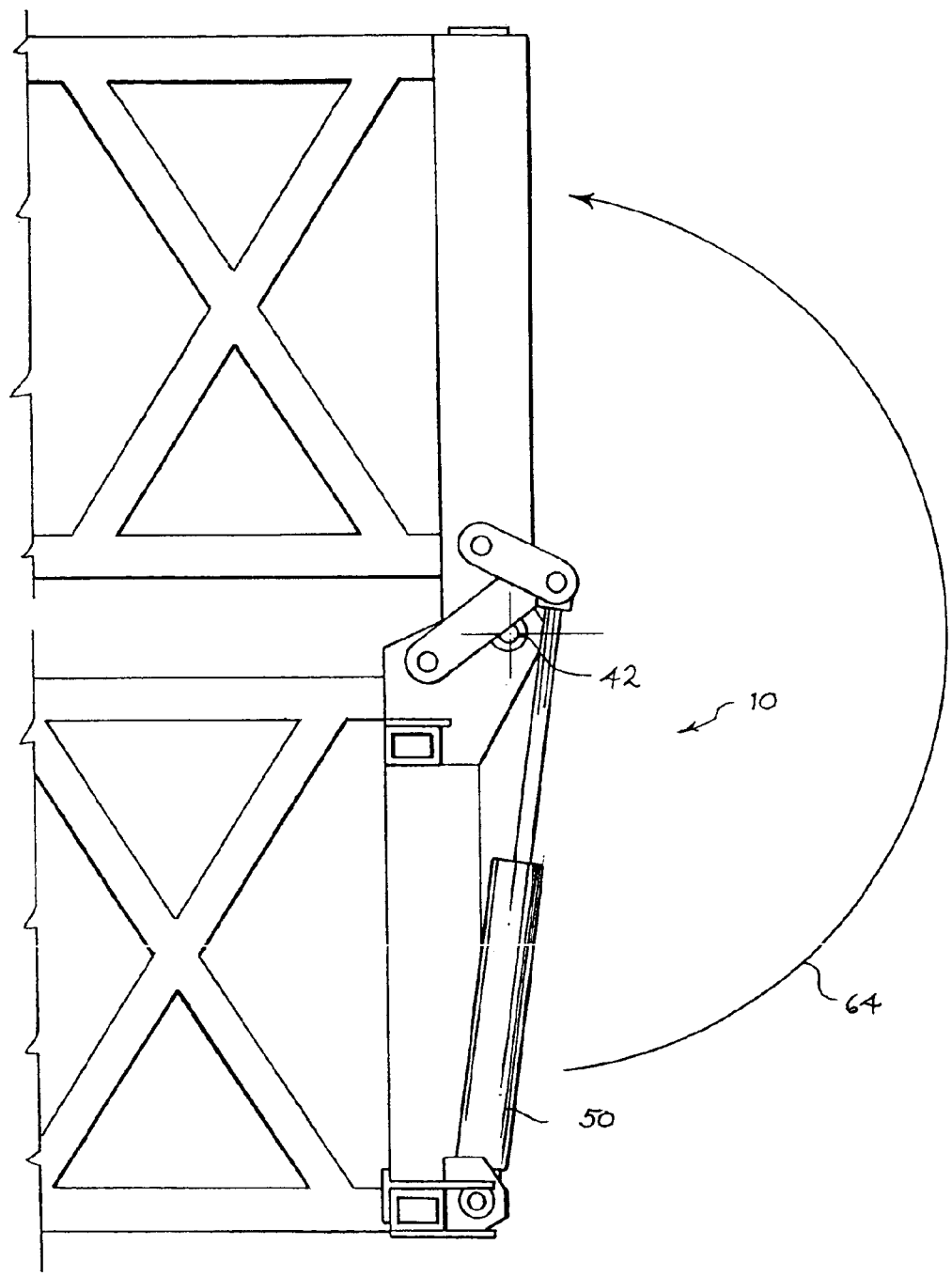

In FIGS. 7–9, the reference symbol 64 designates a rotation angle that will be used as a measure of the rotational position of the second bay 18 with respect to the first bay 12 about the rotational axis 42. In FIG. 6, the rotation angle 64 takes the value of 0°.

Figure 5:
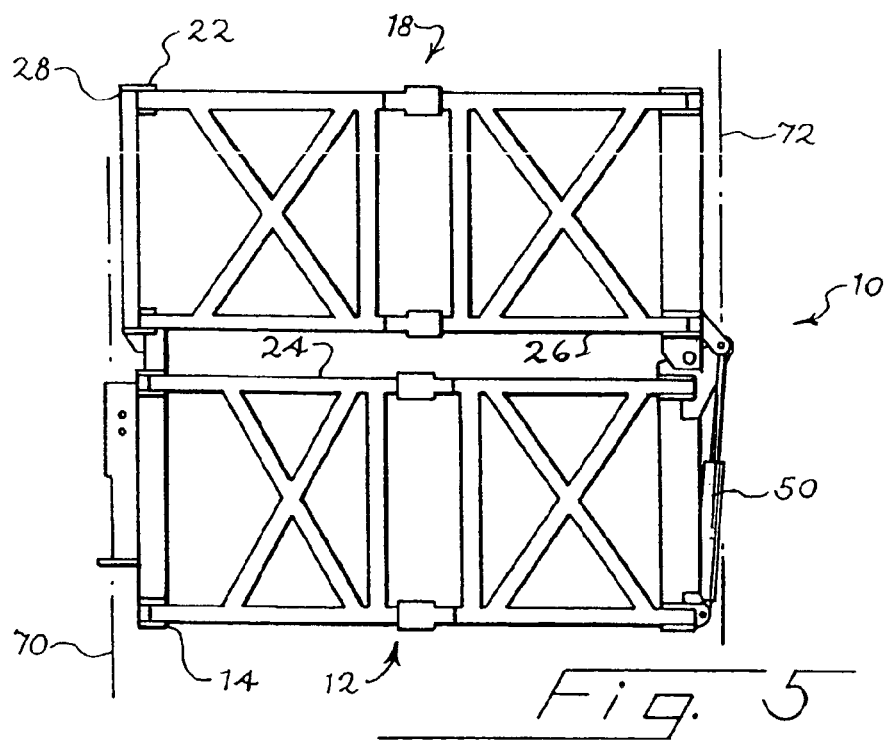

In FIGS. 2 and 5, the reference symbol 70 designates a vertical plane passing through the mounting arrangement 30 forward of the first bay 12, and both the first and second bays 12, 18 are disposed entirely rearwardly of the vertical plane 70 when the crash attenuator 10 is in the deployed position of FIG. 2.

Figure 4:
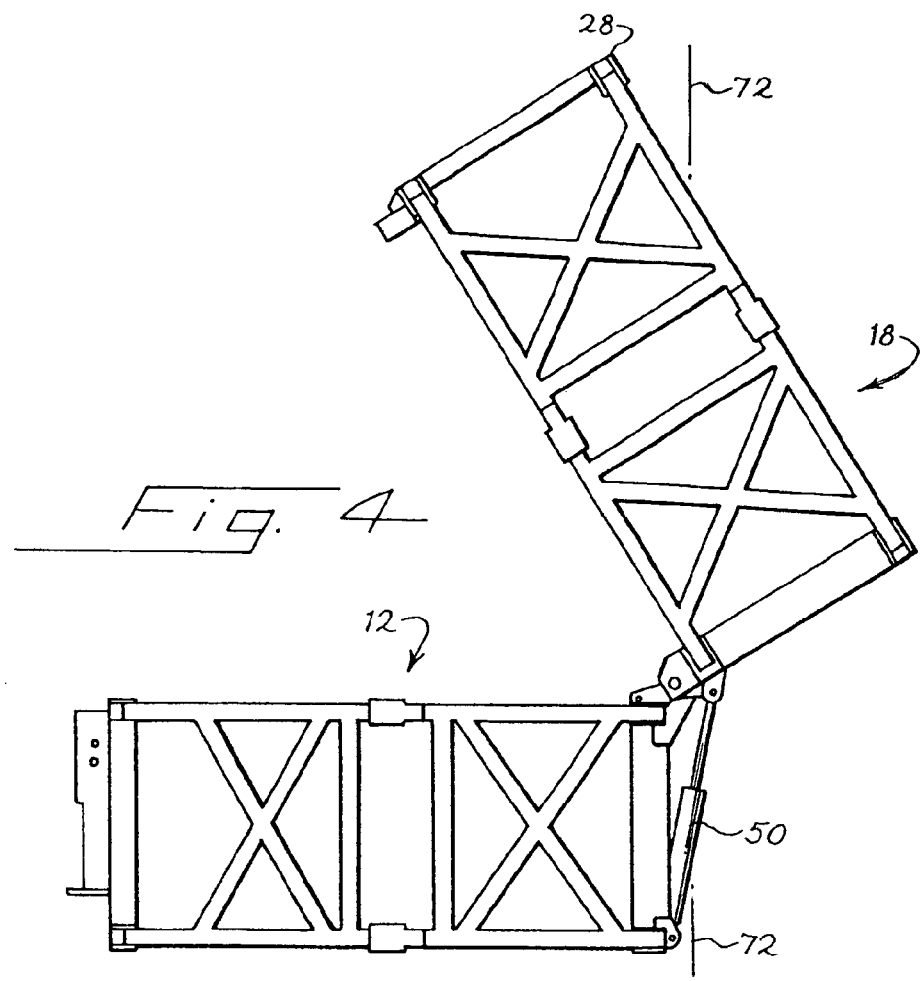

In FIGS. 2, 4 and 5, the reference symbol 72 is used to indicate a plane passing through the rotational axis 42 and oriented transversely to the longitudinal axis 66.

Figure 3:
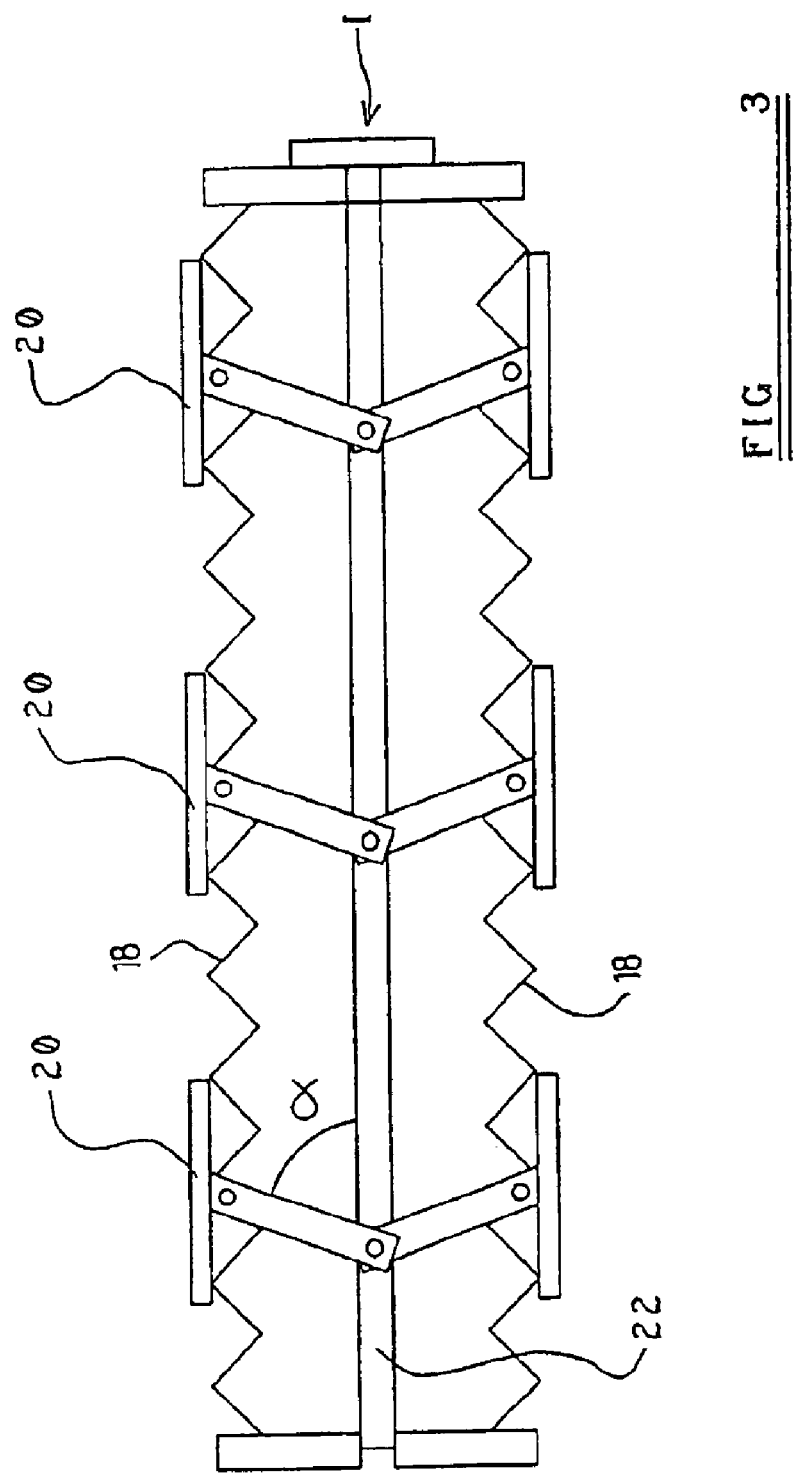
FIGS. 3, 4 and 5 are side views corresponding to FIG. 2, showing the second bay of the crash attenuator as it is raised progressively to the fully retracted position of FIG. 5.

FIGS. 3 and 7 show a side view corresponding to that of FIG. 2, in which the actuator 50 has been extended partially to raise the second bay 18. In the view of FIG. 7, the angle 64 is about 55°. This represents an intermediate stage in the retraction of the second bay 18.

FIGS. 4 and 8 show the crash attenuator 10 at another, more advanced stage in the retraction of the second bay 18. In this case the actuator 50 has been extended until the rotation angle 64 is about 120° (FIG. 8). Note that in this position, the lower edge 28 has moved forwardly of the plane 72 (FIG. 4).

Figure 10:
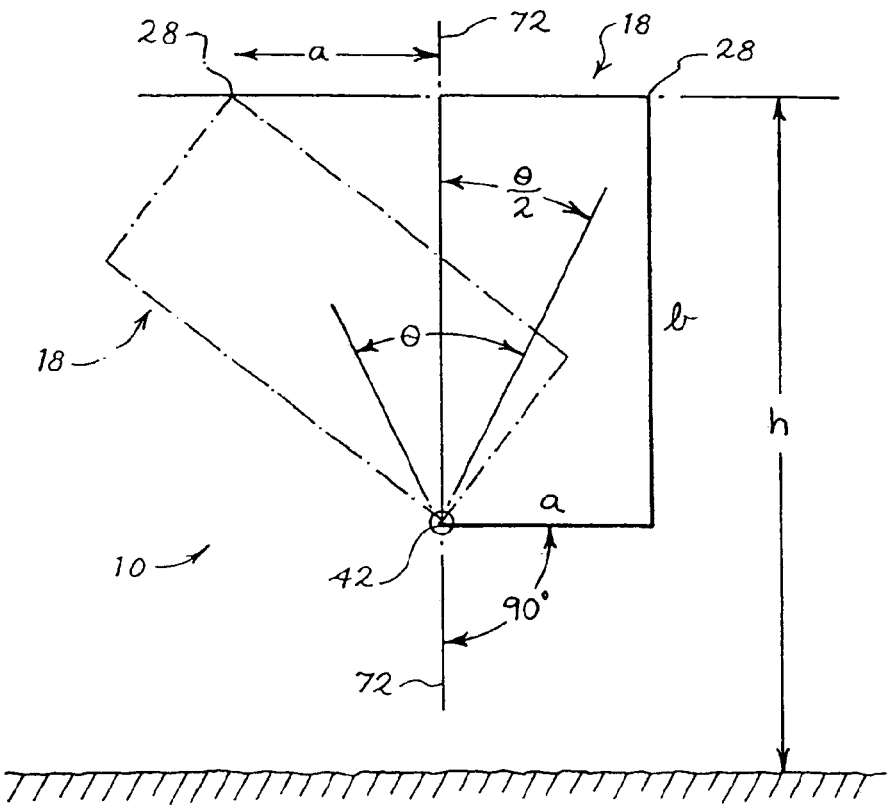
FIG. 10 is a schematic diagram showing the second bay 18 of FIG. 1 in two alternative positions.

As shown in FIG. 10, the second bay 18 is characterized by a depth a and a length b. When the second bay 18 is rotated about the axis 42 by 90° (as shown in solid lines in FIG. 10), the partially-retracted attenuator has a height h. Further rotation has the effect of lifting the lower edge 28 until the lower edge 28 crosses the plane 72, after which the lower edge 28 begins to move downwardly. Once the rotation of the second bay 18 has gone beyond the position shown in dotted lines in FIG. 10, the height of the lower edge 28 (and therefore the overall height of the attenuator 10) becomes less than h. The angle θ/2 of FIG. 10 is equal to arctan (a/b), and the angle θ is equal to 2 arctan (a/b). Therefore, it is preferred that the second bay 18 be rotated by an angle no less than (90+2 arctan (a/b)) in the retracted position in order to ensure that the overall height of the fully retracted attenuator 10 is less than that of an attenuator in which the second bay 18 is rotated by 90° between the deployed and the retracted positions. In this example, (a/b) is equal to 0.5 and the second bay 18 is preferably rotated by a rotation angle no less than 143° between the deployed and the retracted positions. Further retraction of the second bay 18 beyond 143° reduces the overall height of the crash attenuator 10.

Although this example discusses attenuator bays with a rectangular shape, this is in no way meant to limit the scope of this invention. The present invention can be applied to attenuator bays of many other cross-sectional shapes, such as ellipsoidal, polygonal, and other shapes.

FIGS. 5 and 9 show the crash attenuator 10 in the fully retracted position, in which the actuator 50 has been extended to the point where the rotation angle 64 is approximately equal to 180° (FIG. 9). In this fully retracted position, the lower edge 28 is positioned substantially forwardly of the plane 72, on the same side of the plane 72 as the front end 14 of the first bay 12 (FIG. 5). In this position the back end 22 of the second bay 18 is positioned adjacent to and overlying the front end 14 of the first bay 12, and the upper portions 24, 26 face one another. As shown in FIG. 5, in the fully retracted position the first upper portion 24 continues to face upwardly (since it has not been rotated from the position of FIGS. 1 and 2), and the second upper portion 26 now faces downwardly, toward the first bay 12. In the position of FIG. 5, the second bay 18 rests upon and is supported by the first bay 12. Also, both of the first and second bays 12, 18 are still located entirely behind the vertical plane 70.

The second bay 18 can be moved with the actuator 50 from the retracted position of FIGS. 5 and 9 to the deployed position of FIGS. 1, 2 and 6 for use.

Figure 15:
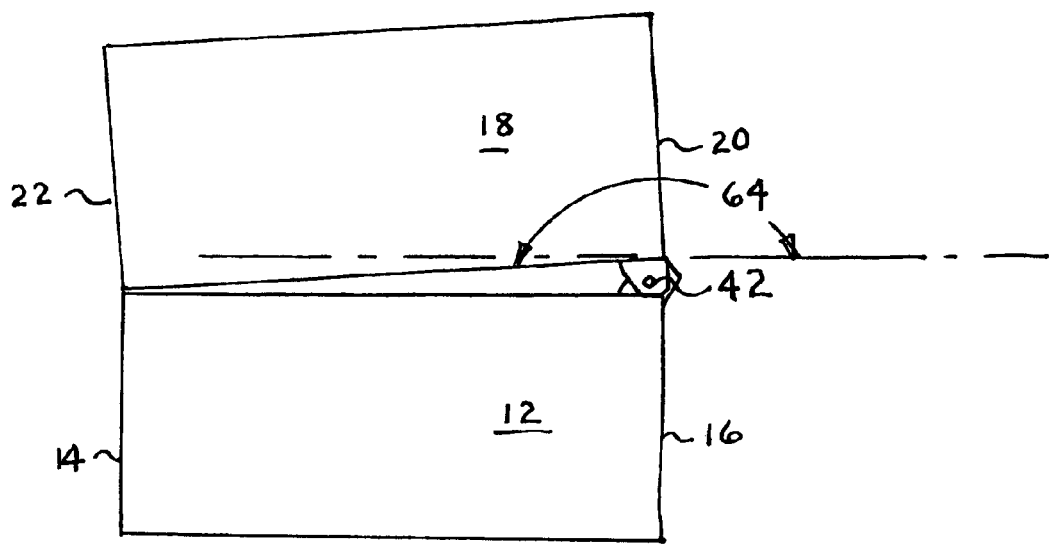
FIG. 15 is a schematic side view of one embodiment of a vehicle mounted crash attenuator in a retracted position.

In the example illustrated in the drawings, the second bay 18 is rotated by about 180° with respect to the first bay 12 in the retracted position of FIGS. 5 and 9 as compared to the deployed position of FIGS. 2 and 6. In alternative embodiments, the second bay 18 mat be rotated to such a large extent. For example, the second bay 18 may be rotated by 145°, 155°, 165° or 175° with respect to the first bay 12. As another example, shown in FIG. 15, the second bay 18 may be rotated by more than 180°, if the rotational axis is positioned such that the back end 22 is lower than the front end 20 in the retracted position. In all cases the second bay is rotated by more than 90° between the deployed and retracted positions. In this example, rotation angles greater than 145° provide the advantage of reducing the overall height of the folded crash attenuator as compared to a folded crash attenuator of the same dimensions that is folded only by a rotation angle of 90° (as in the prior art discussed above). For this reason, the second bay 18 in the retracted position is preferably rotated by a rotation angle 64 greater than 145°, more preferably greater than 165°, and most preferably about 180°. In some cases, the rotation angle 64 may be greater than 180°, as shown for example and without limitation in FIG. 15. Note that the second bay 18 extends forwardly of the plane 72 for all values of the rotation angle 64 greater than 90°.

Of course, it should be understood that a wide range of changes and modifications can be made to the preferred embodiments described above. The crash attenuator can include more than two bays, and the bays themselves may vary widely in construction. For example, bays of the type described in the following U.S. Patents can all be adapted for use with this invention: June U.S. Pat. No. 5,642,792, Gertz U.S. Pat. No. 5,248,129, Gertz U.S. Pat. No. 5,199,577, Krage U.S. Pat. No. 4,711,481, Fritton U.S. Pat. No. 4,635, 981, Walker U.S. Pat. No. 4,008,915. Of course, other types of hinges, actuators and linkages can be substituted for the illustrated elements. As one alternative the actuator can include cable extending between the second bay and the truck and some means such as a winch or the like for pulling the cables to rotate the second bay to the retracted position. Furthermore, the retracted position may leave the second bay somewhat angled with respect to the underlying first bay, rather than in the overlying substantially, parallel position shown in the drawings. For example, if the fully deployed position is characterized by a rotation angle of 170° or 175°, this may reduce the strain on the linkage and the actuator. Preferably, the system is designed such that there is no load on the actuators or the links when the second bay is in either the deployed or the fully retracted position.

By way of example, the following details of construction have been found suitable when the first and second bays 12, 18 are implemented in accordance with the disclosure of U.S. Pat. No. 6,092,959.

Figure 11:
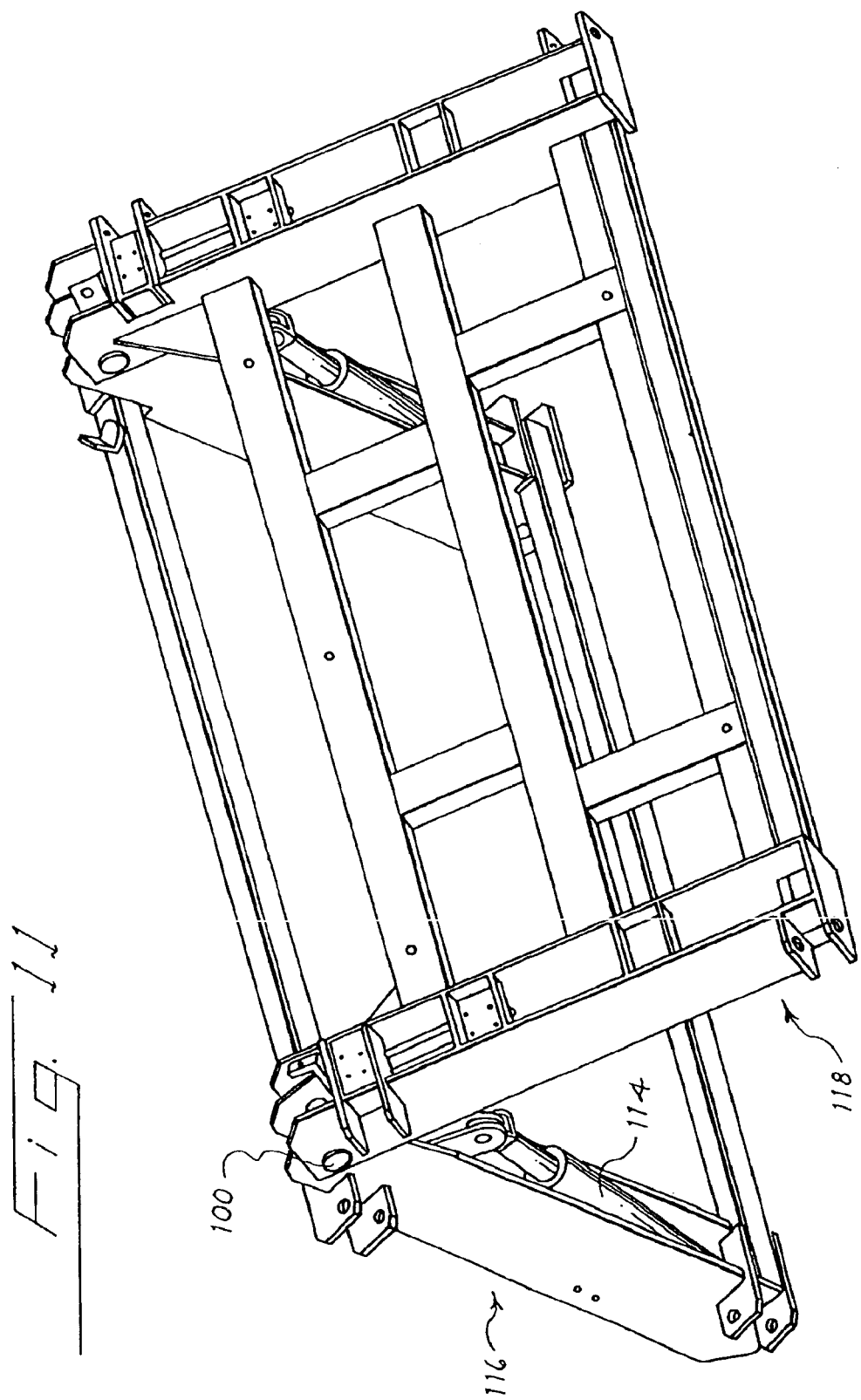
FIGS. 11 and 12 are perspective views of selected components of a second preferred embodiment in the partially retracted and fully retracted positions, respectively.
Figure 12:
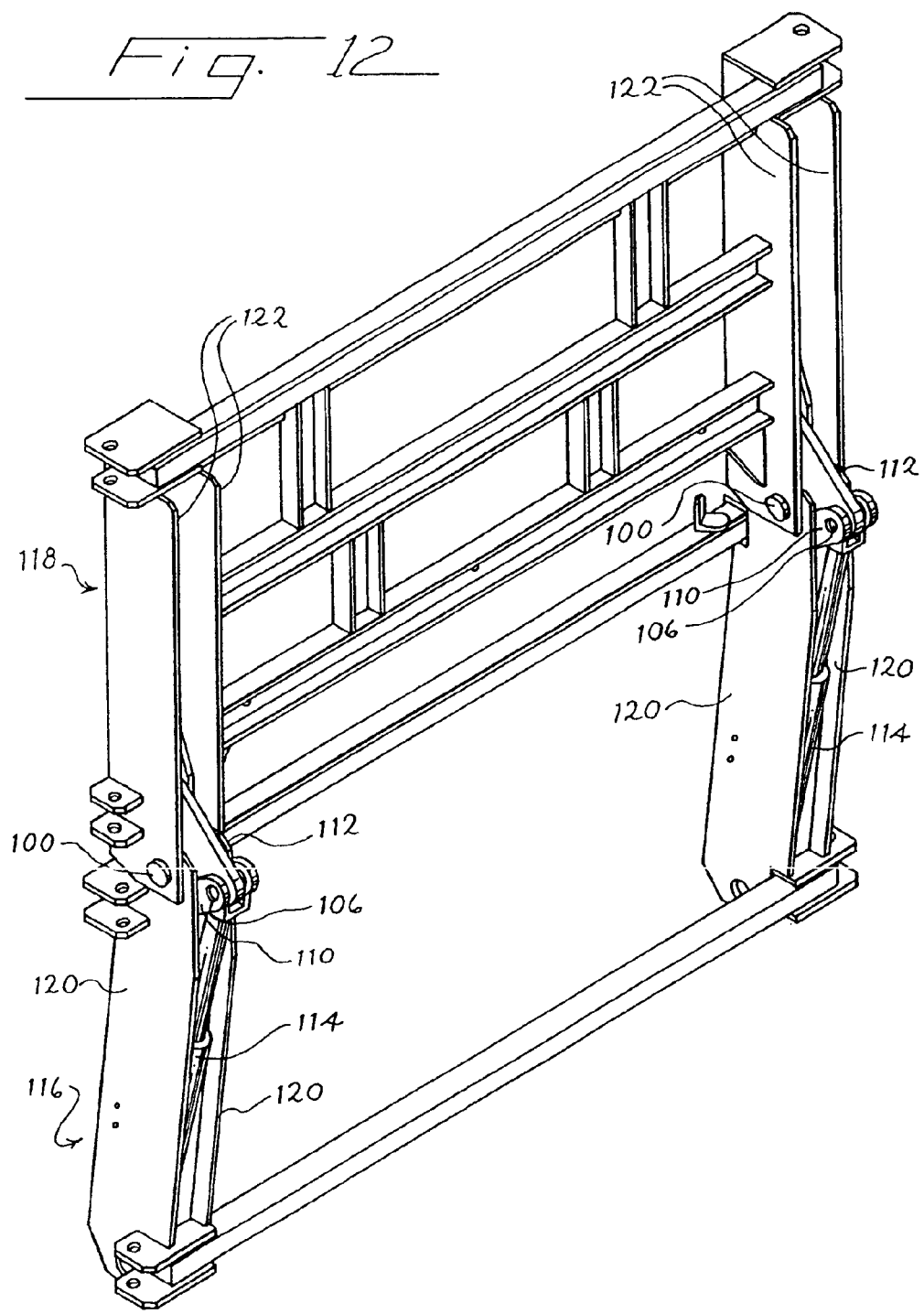
Figure 13:
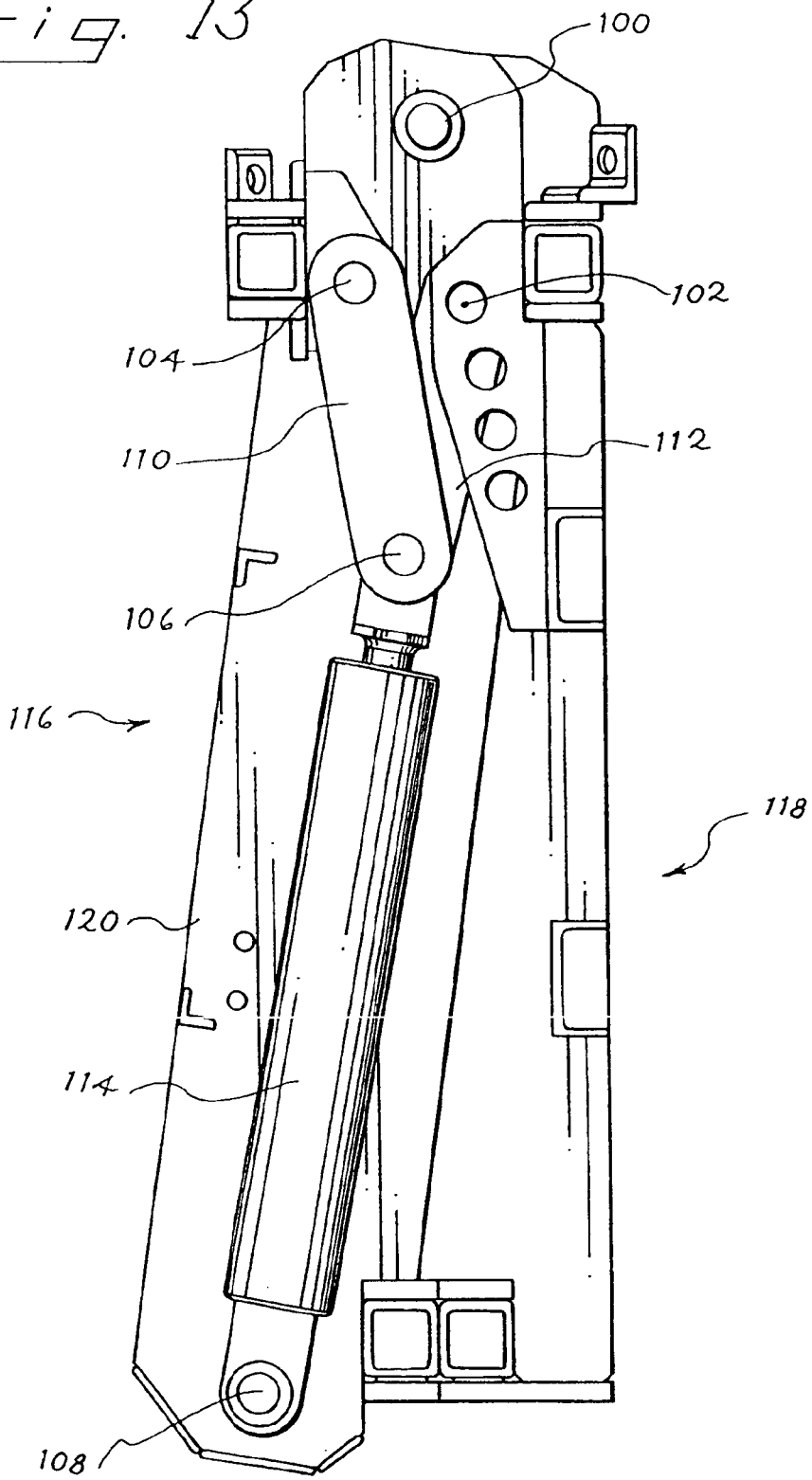
FIG. 13 is a sectional view through the elements of FIGS. 11 and 12 in the deployed position.

The FIGS. 11–13 show selected components of a best mode example. The illustrated components of FIGS. 11 and 12 include a frame 116 that forms the back end of the first bay and a frame 118 that forms the front end of the second bay. The frames 116, 118 are rotatably interconnected by a rotational joint 100, and the position of the frame 118 (and therefore the second bay) is determined by actuators, which in this example take the form of hydraulic cylinders 114. As best shown in FIG. 12, the upper end of the rod of each hydraulic cylinder 114 is connected by a first link 110 to the frame 116 and by a second link 112 to the frame 118.

FIG. 12 shows the manner in which the frame 116 includes a pair of vertically oriented, spaced, parallel plates 120 disposed on opposite sides of each of the hydraulic cylinders 114. Similarly, the frame 118 includes a pair of vertically oriented, spaced, parallel plates 122, each disposed outwardly of a respective one of the plates 120. As shown in FIG. 12, when the frame 118 is positioned in the fully retracted position, each hydraulic cylinder 114 is at least partially received between the respective plates 120. Similarly, as shown in FIG. 13, when the hydraulic cylinders 114 move the second frame 118 to the deployed position the hydraulic cylinders 114 are received between and protected by the respective plates 120. In this way, the hydraulic cylinders 114 are protected from damage from low velocity impacts, or from casual damage, for example in a highway work zone.

Simply by way of example, the parameters of Table 1 have been found suitable in one embodiment of this invention. Of course, all of these parameters are intended by way of illustration, and they in no way limit the scope of this invention. Reference numerals of Table 1 identify the associated structure in the drawings.

The energy absorbing elements of the first and second bays 12, 18 can be constructed as described for example in U.S. Pat. Nos. 6,092,959 and 5,199,755, assigned to the Assignee of the present invention and hereby incorporated by reference, and the material used to form individual cells can for example be sheet aluminum.

In this example, the actuator is a welded hydraulic cylinder (welded body) as opposed to a tie rod type hydraulic cylinder, because a welded cylinder has a smaller profile with smaller outside dimensions and is therefore more easily packaged. Of course, a tie rod type cylinder can be used in alternative embodiments.

TABLE 1

Presently Preferred Crash Alternator Parameters

| | | |
|---|---|---|
| A. Mass of Frame Elements (kg) | | |
| Transverse frame at back end 16 | | 72 |
| Transverse frame at front end 20 | | 82 |
| Transverse frame at back end 22 | | 152 |
| Side frame element | | 32 |
| B. Moment of Inertia of Side Frame Elements (kg-m$^2$) | | 1.92 |
| C. Longitudinal Gap Between Energy Absorbing Element and Adjacent Transverse Frames (m) | | |
| First bay 12 | | 0.229 |
| Second bay 18 | | 0.178 |

| | No. of cells/row | Material Thickness (mm) |
|---|---|---|
| D. Energy Absorbing Element of First Bay 12 | | |
| Row 1 (adjacent back end 16) | 8 | 0.81 |
| Row 2 | 8 | 0.81/1.02 (4 of each) |

TABLE 1-continued

Presently Preferred Crash Alternator Parameters

| | | |
|---|---|---|
| Row 3 | 16 | 1.21 |
| Row 4 | 16 | 1.21 |
| Row 5 (adjacent front end 14) | 12 | 0.81/1.02 (6 of each) |
| E. Energy Absorbing Element of Second Bay 18 | | |
| Row 1 (adjacent back end 22) | 4 | 0.81 |
| Row 2 | 4 | 0.81 |
| Row 3 | 8 | 0.81/1.02 (4 of each) |
| Row 4 | 16 | 1.27 |
| Row 5 (adjacent front end 20) | 8 | 1.02 |

| | |
|---|---|
| F. Diameters of Pins in Rotational Joints (mm) | |
| Joint 100 | 29 |
| Joints 102–108 | 25 |
| G. Dimensions of Hydraulic Actuator 114 (mm) | |
| Bore (diameter) | 64 |
| Rod (diameter) | 32 |
| Stroke (travel) | 305 |
| H. Distance Between Elements of FIG. 13 (mm) | |
| First link 110 (Pin-to-pin) | 178 |
| Second link 112 (Pin-to-pin) | 169 |
| Joint 100 to joint 108 | 846 |
| Retracted length of actuator 114 | 565 |

In one preferred embodiment, the individual bays of the crash attenuator shown in FIGS. 1–6 of Leonhardt U.S. Pat. No. 6,092,959 (assigned to the assignee of the present invention and hereby incorporated by reference in its entirety) are modified as follows:

The bolts 48 and nuts 50 that releasably hold the hinges 34 in the initial position of FIGS. 2 and 4 are eliminated. (All references in this paragraph are to figure numbers and reference numbers of U.S. Pat. No. 6,092,959.) In substitution, each bay is provided with upper and lower tie rods that extend across the bay (over and under the respective energy absorbing element 16, respectively). Each tie rod is anchored at each end to a side frame element 34 near the respective pin 56, and each tie rod includes two overlapping parts held together by one or more shear pins such as bolts. A force tending to collapse a bay places the tie rods of the bay in tension, and the shear pins are designed to fail at a selected tensile load on the tie rod. Once the shear pins fail, the hinges 34 on both sides of the bay are free to open, and the crash cushion operates as described in U.S. Pat. No. 6,092,959. The main advantage of the tie rods described above is that they ensure that the hinges on both sides of a bay begin to rotate at the same time during a collision The crash attenuator 10 provides important advantages. In the fully retracted position of FIG. 5 the attenuator is short in length (measured horizontally from the truck T of FIG. 1) as well as in height (measured vertically from the roadway that supports the truck T of FIG. 1) This arrangement facilitates over the road transport of the raised crash attenuator 10, and it presents fewer height restrictions to movement of the truck T, even when the crash attenuator 10 is fully retracted.

As used herein the term "position" is intended broadly to encompass a range of positions.

The terms "front" or "forward" are intended to mean closer to the vehicle on which a crash attenuator is mounted, and the terms "back" or "rear" are intended to mean farther away from the vehicle on which the crash attenuator is mounted.

The foregoing detailed description has discussed only a few of the many forms that this invention can take. This detailed description is therefore intended by way of illustration, and not by way of limitation. It is only the following claims, including all equivalents, that are intended to define the scope of this invention.

What is claimed is:

1. A vehicle mounted crash attenuator comprising:
a collapsible first bay comprising a front end adapted for mounting to a vehicle and a back end spaced from said front end in a longitudinal direction, wherein said first bay has a substantially horizontal orientation; and
a collapsible second bay comprising a front end and a back end spaced from said front end in a longitudinal direction, said front end of said second bay pivotally connected to said back end of said first bay, wherein said second bay is pivotable relative to said first bay between a deployed position, wherein said second bay has a substantially horizontal orientation, and a retracted position, wherein said second bay is rotated relative to said first bay through a rotation angle of greater than 90° relative to said deployed position as said first bay is maintained in said substantially horizontal orientation.

2. A vehicle mounted crash attenuator comprising:
a collapsible first bay comprising a front end adapted for mounting to a vehicle and a back end spaced from said front end in a longitudinal direction, wherein said first bay has a substantially horizontal orientation; and
a collapsible second bay comprising a front end and a back end spaced from said front end in a longitudinal direction, said front end of said second bay pivotally connected to said back end of said first bay, wherein said second bay is pivotable relative to said first bay between a deployed position, wherein said second bay has a substantially horizontal orientation, and a retracted position, wherein said second bay is rotated relative to said first bay through a rotation angle of greater than 90° relative to said deployed position, and wherein said first and second bays each have an upper surface, wherein at least a portion of said upper surface of said second bay overlies and faces at least a portion of said upper surface of said first bay when said second bay is in said retracted position.

3. The vehicle mounted crash attenuator of claim 1 wherein said rotation angle is about 180°.

4. The vehicle mounted crash attenuator of claim 1 wherein said first and second bays comprise first and second frame structures respectively.

5. The vehicle mounted crash attenuator of claim 4 wherein said first and second bays comprise first and second energy absorbing elements disposed in said first and second frame structures respectively.

6. The vehicle mounted crash attenuator of claim 1 further comprising an actuator coupled to said second bay, said actuator operable to move said second bay between said deployed and retracted positions.

7. A vehicle mounted crash attenuator comprising:
a collapsible first bay comprising a front end adapted for mounting to a vehicle and a back end spaced from said front end in a longitudinal direction, wherein said first bay has a substantially horizontal orientation; and
a collapsible second bay comprising a front end and a back end spaced from said front end in a longitudinal direction, said front end of said second bay pivotally connected to said back end of said first bay, wherein said second bay is pivotable relative to said first bay between a deployed position, wherein said second bay has a substantially horizontal orientation, and a retracted position, wherein said second bay is rotated relative to said first bay through a rotation angle of greater than 90° relative to said deployed position; and
an actuator coupled to said second bay, said actuator operable to move said second bay between said deployed and retracted positions, wherein said actuator further comprises first an second pivots, wherein said first pivot is coupled with said back end of said first bay, wherein said second pivot is coupled with said back end of said first bay by a first link, and wherein the second pivot is coupled with said front end of said second bay by a second link.

8. The vehicle mounted crash attenuator of claim 7 wherein said actuator comprises a hydraulic cylinder extending between the first and second pivots.

9. The vehicle mounted crash attenuator of claim 1 wherein said rotation angle comprises a first rotation angle, and wherein said back end of said second bay comprises a lower edge, wherein said lower edge is positioned at a height h when said second bay is rotated relative to said first bay by a second rotation angle of about 90°, and wherein said first rotation angle is selected such that in the retracted position said lower edge is positioned at a height no greater than h.

10. The vehicle mounted crash attenuator of claim 1 wherein said first bay remains in said substantially horizontal orientation as said second bay is rotated between said deployed and retracted positions.

11. The vehicle mounted crash attenuator of claim 1 wherein said second bay is pivotable relative to said first bay about a rotational axis.

12. A vehicle mounted crash attenuator comprising:
a collapsible first bay comprising a front end adapted for mounting to a vehicle and a back end spaced from said front end in a longitudinal direction, wherein said first bay has a substantially horizontal orientation; and
a collapsible second bay comprising a front end and a back end spaced from said front end in a longitudinal direction, said front end of said second bay pivotally connected to said back end of said first bay, wherein said second bay is pivotable relative to said first bay about a rotational axis between a deployed position, wherein said second bay has a substantially horizontal orientation, and a retracted position, wherein said second bay is rotated relative to said first bay through a rotation angle of greater than 90° relative to said deployed position. wherein said back end of said second bay comprises a lower edge, wherein said first bay defines a plane passing perpendicular to a longitudinal axis extending between said front end and said back end of said first bay, and wherein the rotation angle is sufficiently greater than 90° such that when said second bay is in the retracted position, the lower edge is positioned on the same side of the plane as is said front end of said first bay.

13. The vehicle mounted crash attenuator of claim 1 wherein said rotation angle is greater than 125°.

14. The vehicle mounted crash attenuator of claim 1 wherein said rotation angle is greater than 145°.

15. The vehicle mounted crash attenuator of claim 1 wherein said rotation angle is greater than 165°.

16. The vehicle mounted crash attenuator of claim 1 wherein said rotation angle is greater than 180°.

17. The vehicle mounted crash attenuator of claim 1 further comprising a mounting arrangement secured to said front end of said first bay, wherein said mounting arrangement accommodates rotation of said first bay about a substantially horizontal axis adjacent said front end thereof.

18. A vehicle mounted crash attenuator comprising:
a collapsible first bay comprising a front end adapted for mounting to a vehicle and a back end spaced from said front end in a longitudinal direction, wherein said first bay has a substantially horizontal orientation; and
a collapsible second bay comprising a front end and a back end spaced from said front end in a longitudinal direction, said front end of said second bay pivotally connected to said back end of said first bay, wherein said second bay is pivotable relative to said first bay between a deployed position, wherein said second bay has a substantially horizontal orientation, and a retracted position, wherein said second bay is rotated relative to said first bay through a rotation angle of greater than 90° relative to said deployed position, wherein said front end of said second bay is positioned adjacent said back end of said first bay, and said back end of said second bay is positioned adjacent said front end of said first bay when said second bay is in said retracted position.

19. The vehicle mounted crash attenuator of claim 18 wherein said second bay rests on said first bay when said second bay is in said retracted position.

20. A vehicle operable on a roadway comprising:
a rear end; and
a vehicle mounted crash attenuator moveable between a deployed configuration and a retracted configuration, said vehicle mounted crash attenuator comprising:
a first bay comprising a front end coupled to said rear end and a back end spaced from said front end in a longitudinal direction, wherein said first bay has a top and a bottom and a substantially horizontal orientation, wherein said bottom is spaced above the roadway when said vehicle mounted crash attenuator is in said retracted and deployed configurations; and
a second bay comprising a front end and a back end spaced from said front end in a longitudinal direction, said front end of said second bay pivotally connected to said back end of said first bay, wherein said second bay is pivotable relative to said first bay and has a substantially horizontal orientation then said vehicle mounted attenuator is in said deployed configuration, and wherein said second bay is rotated relative to said first bay through a rotation angle of greater than 90° relative to said substantially horizontal orientation of said second bay as said first bay is maintained in said substantially horizontal orientation when said vehicle mounted crash attenuator is in said retracted configuration.

21. A vehicle operable on a roadway comprising:
a rear end; and
a vehicle mounted crash attenuator moveable between a deployed configuration and a retracted configuration, said vehicle mounted crash attenuator comprising:
a first bay comprising a front end coupled to said rear end and a back end spaced from said front end in a longitudinal direction, wherein said first bay has a top and a bottom and a substantially horizontal orientation, wherein said bottom is spaced above the roadway when said vehicle mounted crash attenuator is in said retracted and deployed configurations; and
a second bay comprising a front end and a back end spaced from said front end in a longitudinal direction, said front end of said second bay pivotally connected to said back end of said first bay, wherein said second bay is pivotable relative to said first bay and has a substantially horizontal orientation when said vehicle mounted attenuator is in said deployed configuration, and wherein said second bay is rotated relative to said first bay through a rotation angle of greater than 90° relative to said substantially horizontal orientation of said second bay when said vehicle mounted crash attenuator is in said retracted configuration, wherein said first and second bays each have an upper surface, wherein at least a portion of said upper surface of said second bay overlies and faces at least a portion of said upper surface of said first bay when said vehicle mounted crash attenuator is in said deployed configuration.

22. The vehicle of claim 21 wherein said rotation angle is about 180°.

23. The vehicle of claim 20 further comprising an actuator coupled between said first and second bays, said actuator operable to move said second bay between said deployed and retracted configurations.

24. The vehicle of claim 20 wherein said rotation angle is greater than 125°.

25. The vehicle of claim 20 further comprising a mounting arrangement disposed between said rear end and said front end of said first bay, wherein said mounting arrangement accommodates rotation of said first bay relative to said rear end about a substantially horizontal axis adjacent said front end of said first bay.

26. A vehicle operable on a roadway comprising:
a rear end; and
a vehicle mounted crash attenuator moveable between a deployed configuration and a retracted configuration, said vehicle mounted crash attenuator comprising:
a first bay comprising a front end coupled to said rear end and a back end spaced from said front end in a longitudinal direction, wherein said first bay has a top and a bottom and a substantially horizontal orientation, wherein said bottom is spaced above the roadway when said vehicle mounted crash attenuator is in said retracted and deployed configurations; and
a second bay comprising a front end and a back end spaced from said front end in a longitudinal direction, said front end of said second bay pivotally connected to said back end of said first bay, wherein said second bay is pivotable relative to said first bay and has a substantially horizontal orientation when said vehicle mounted attenuator is in said deployed configuration, and wherein said second bay is rotated relative to said first bay through a rotation angle of greater than 90° relative to said substantially horizontal orientation of said second bay when said vehicle mounted crash attenuator is in said retracted configuration, wherein said front end of said second bay is positioned adjacent said back end of said first bay, and said back end of said second bay is position adjacent said front end of said first bay when said vehicle mounted crash attenuator is in said retracted position.

* * * * *